United States Patent [19]
Baudin

[11] Patent Number: 6,152,324
[45] Date of Patent: Nov. 28, 2000

[54] FLOW REDUCER MEMBER, IN PARTICULAR FOR A RECEPTACLE CONTAINING A COSMETIC, AND A METHOD OF MANUFACTURE

[75] Inventor: Gilles Baudin, Domont, France

[73] Assignee: L'Oreal, Paris, France

[21] Appl. No.: 09/188,143

[22] Filed: Nov. 9, 1998

[30] Foreign Application Priority Data

Nov. 14, 1997 [FR] France .................................. 97 14306

[51] Int. Cl.[7] .................................................. G01F 11/00
[52] U.S. Cl. ............................ 222/1; 222/212; 222/494; 264/255; 264/318
[58] Field of Search ..................................... 222/212, 494, 222/545, 546, 1; 264/250, 255, 259, 263, 296, 318

[56] References Cited

U.S. PATENT DOCUMENTS

| | | | |
|---|---|---|---|
| 2,792,149 | 5/1957 | Lutz | 222/494 X |
| 3,348,744 | 10/1967 | Morin | 264/318 X |
| 5,924,605 | 7/1999 | Baudin et al. | 222/494 |

FOREIGN PATENT DOCUMENTS

| | | |
|---|---|---|
| 2 745 552 A1 | 9/1997 | France . |
| 295 08 151 U1 | 9/1995 | Germany . |
| 1046518 | 10/1966 | United Kingdom . |
| WO 97/31837 | 9/1997 | WIPO . |
| WO 98/02361 | 1/1998 | WIPO . |

*Primary Examiner*—Joseph A. Kaufman
*Attorney, Agent, or Firm*—Oliff & Berridge, PLC

[57] ABSTRACT

A dispenser head for dispensing a fluid includes a dispenser endpiece of rigid or semi-rigid thermoplastic material and a flow reducer member of elastically deformable thermoplastic material secured to the endpiece. The member includes at least one slot whose edges are suitable for moving apart under the effect of thrust from the fluid while it is being dispensed. A method of making the dispenser head includes making the flow reducer member by injection molding from one or more injection points situated on one or both sides of the slot.

26 Claims, 4 Drawing Sheets

FIG_6

FLOW REDUCER MEMBER, IN PARTICULAR FOR A RECEPTACLE CONTAINING A COSMETIC, AND A METHOD OF MANUFACTURE

The present invention relates to dispensing a fluid, e.g. a cosmetic or a foodstuff.

The invention relates more particularly to a dispenser head having an endpiece of rigid or semi-rigid plastics material and a flow reducer member of elastically deformable plastics material secured to the endpiece.

BACKGROUND OF THE INVENTION

British patent GB-1 046 518 or German utility model DE 29508151 disclose a dispenser head for a receptacle having a flexible wall, the head comprising a rigid endpiece surmounted by a closure membrane made of rubber or of elastomer and provided with a slot made by cutting through the membrane and having edges that touch each other at rest.

When the user exerts pressure on the wall of the receptacle, the edges of the slot move apart under thrust from the fluid.

That kind of dispenser head does not make it easy to measure out the fluid.

To extract fluids, the user must press hard against the wall of the receptacle and, when the slot opens, the fluid is dispensed suddenly.

The user can then be surprised and stop pressing too late on the receptacle, thereby causing too much fluid to be dispensed.

In its French patent application No. FR-A-2 745 552, the Applicant company has described a dispenser head including a flow reducer member made of an elastically deformable plastics material, provided with a slot having non-touching edges, which slot is therefore never completely closed and makes it easier to measure out the fluid while nevertheless preventing it from leaking out of the receptacle when at rest.

OBJECTS AND SUMMARY OF THE INVENTION

The invention seeks specifically to enable such a flow reducer member to be manufactured in a manner that is reliable and of low cost.

The invention also seeks to improve the reliability of the flow reducer member, to increase ease of use, and to make packaging and dispensing devices fitted with such a flow reducer member even more attractive for the consumer.

The invention thus provides a novel method of making a dispenser head for dispensing a fluid, the head including a dispenser endpiece of rigid or semi-rigid thermoplastic material and a flow reducer member of elastically deformable thermoplastic material secured to the endpiece, said member having at least one slot whose edges are suitable for moving apart under the effect of thrust from the fluid while it is being dispensed, the method including making the flow reducer member by injection molding from one or more injection points situated on one or both sides of the slot.

In a particular implementation of the method, the flow reducer member can be overmolded on the endpiece, i.e. the flow reducer member is molded in a machine that is different from the machine used for molding the endpiece.

In a variant implementation of the method, the flow reducer member is made simultaneously with the endpiece by dual injection, in the same machine which has a plurality of nozzles feeding various systems of channels in the mold.

In a preferred implementation of the invention, there is only one slot, which slot is bordered by a bead of material, and the elastically deformable thermoplastic material is injected via an orifice whose axis is situated close to, or preferably in, a midplane perpendicular to the longitudinal direction of the slot or, in a variant, by two orifices having axes situated close to, or preferably in, said midplane but on opposite sides of the slot, the axis(es) of said orifice(s) preferably opening out into the periphery of the flow reducer member.

The invention applies more particularly, but not exclusively, to a molding operation making a slot having edges that do not touch.

Surprisingly, such a method makes it possible to obtain a flow reducer member without significant molding defects and without a zone of weakness that would be detrimental to its operation, the slot being particularly regular in spite of its small width.

Since the slot is obtained during molding, there is no need to proceed with a separate operation of cutting the material constituting the flow reducer member in order to make the slot, contrary to the description of above-mentioned application DE-A-29508151.

The invention also provides a dispenser head for dispensing a fluid, the head comprising a dispenser endpiece and an elastically deformable flow reducer member secured to the endpiece, said member having at least one slot whose edges are suitable for moving apart under the effect of thrust from the fluid while it is being dispensed, wherein said flow reducer member is made by injection molding and presents traces of one or more injection points on one or both sides of the slot.

In a preferred embodiment, the slot is bordered by a bead of material.

The invention also provides a flow reducer member for a dispenser endpiece, the member comprising an elastically deformable flexible membrane having a thin zone at its periphery, said membrane including a slot, the outside surface of the membrane preferably being concave at rest and its inside surface optionally also being provided, around the slot and in the immediate vicinity thereof, with a bead of material.

In a preferred embodiment, the slot is open at rest.

The invention also provides a device for packaging and dispensing a fluid, the device comprising a receptacle and a dispenser head as specified above.

BRIEF DESCRIPTION OF THE DRAWINGS

Other characteristics and advantages of the present invention appear on reading the following detailed description of a non-limiting embodiment of the invention, and on examining the accompanying drawings, in which.

MORE DETAILED DESCRIPTION

Figure 1:
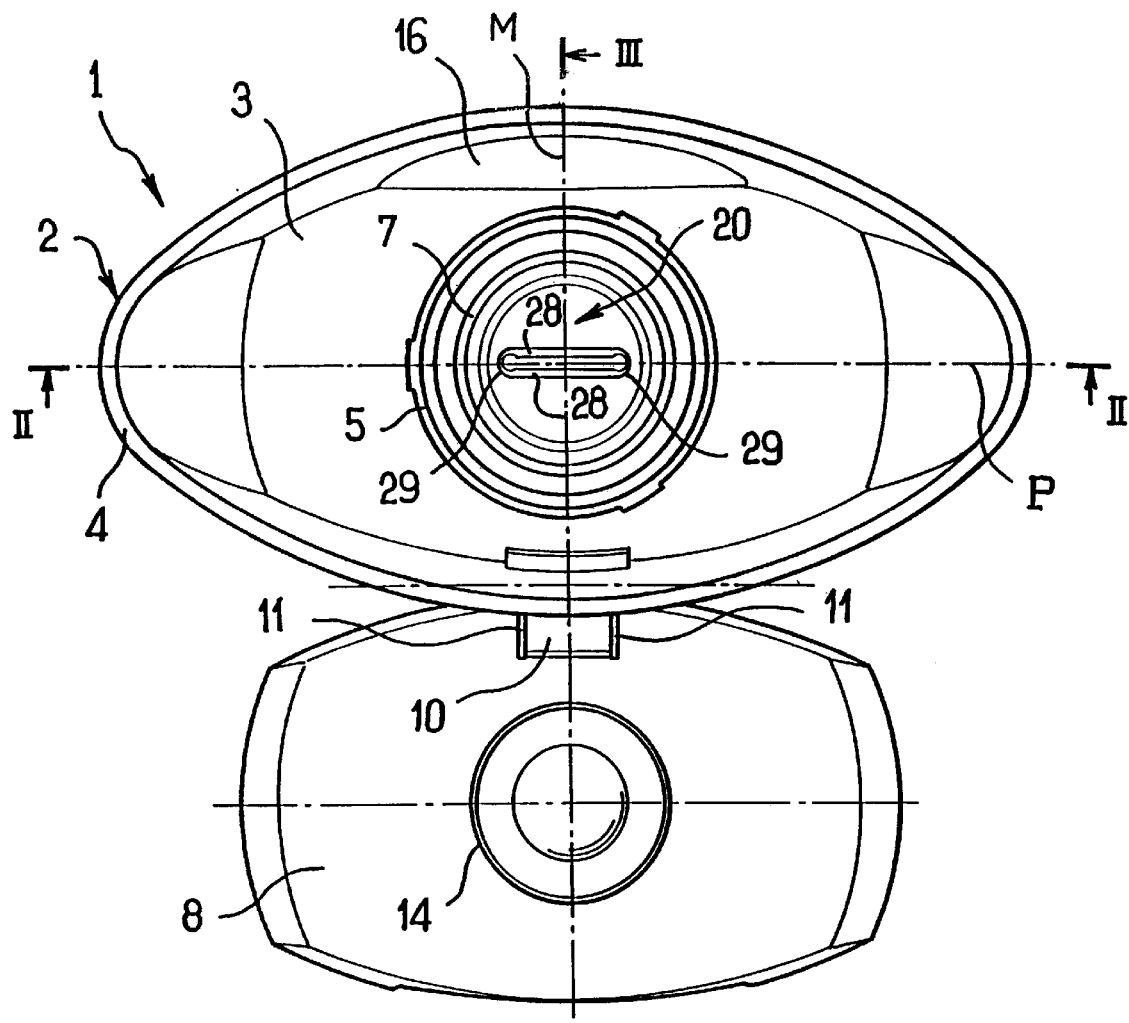
FIG. 1 is a view from below of the dispenser head, the cap being in the open position.
Figure 2:
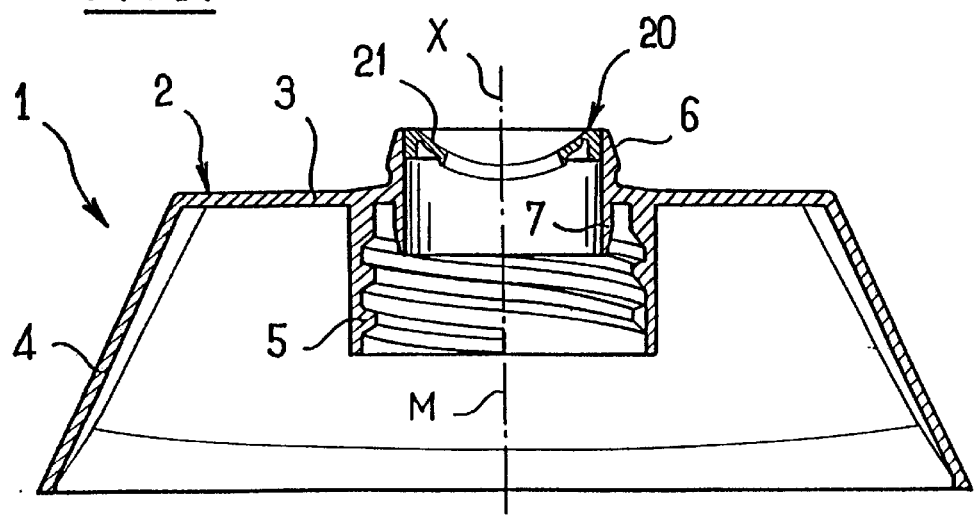
FIG. 2 is a diagrammatic section view on line II—II of FIG. 1.
Figure 3:
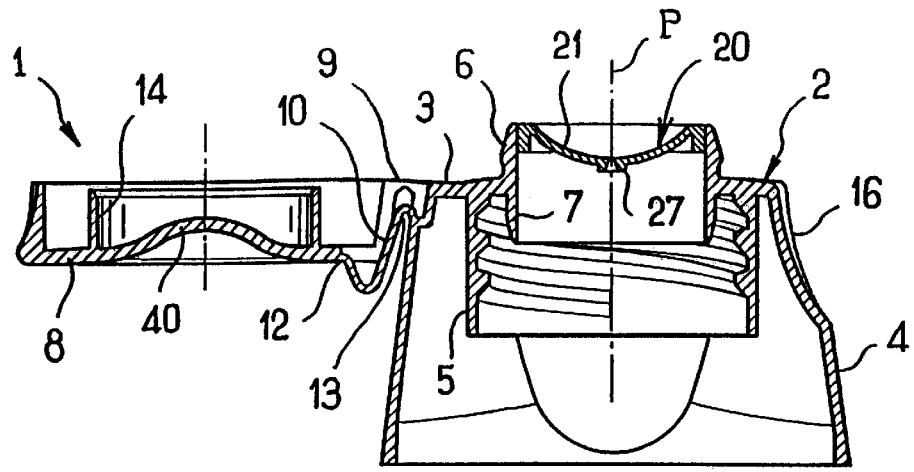
FIG. 3 is a diagrammatic section view on line III—III of FIG. 1.

The dispenser head 1 shown in FIGS. 1 to 3 is designed to be fixed on a receptacle, preferably a receptacle having flexible walls, containing a fluid, e.g. a shampoo or a foaming shower gel.

The fluid may present viscosity lying, for example, in the range 0.6 Pa.s to 10 Pa.s.

The dispenser head 1 has a body 2 and a cap 8 capable of pivoting on the body 2 between an open position and a closed position.

The body 2 has a dispenser endpiece 6 in its top portion, said endpiece 6 being supported by a mounting skirt 5 itself surrounded by an outer skirt 4 of a shape that is adapted to come into register with the wall of the receptacle when the dispenser head 1 is fixed thereon.

The outer skirt 4 is connected to the mounting skirt 5 by a wall 3 which is plane and perpendicular to the axis X, and when seen in plan view is oblong in shape, being elongate in the direction of the pivot axis of the cap 8.

In the example shown, the receptacle has a neck with an outside thread and the mounting skirt 5 has an inside thread for screwing onto it.

The endpiece 6 extends inside the mounting skirt 5 so as to form an annular sealing lip 7 shaped to bear against the radially inner surface of the neck of the receptacle.

In the embodiment described, the cap 8 is integrally molded with the body 2 and it is connected thereto via a film-hinge 9.

More particularly, the film-hinge 9 is made on either side of a return spring blade 10 whose sides 11 are free relative to the cap 8 and to the body 2 and whose ends are hinged respectively to the cap 8 and to the body 2 via film-hinges 12 and 13.

The general shape of the blade 10 is that of a hairpin bend tending to urge the cap into its open position, in conventional manner.

The cap 8 is provided on its inside face with an annular sealing lip 14 for pressing against the radially outer surface of the endpiece 6 with sufficient friction to hold the cap in its closed position.

The radially outer surface of the endpiece 6 is slightly conical so as to promote centering of the sealing lip 14 when the cap is pressed down on the body 2.

A setback 16 is formed in the outer skirt 4 of the body 2 on its side opposite from its side having the film-hinge 9 so as to enable the user to push a finger up under the cap and lift it.

The body 2 and the cap 8 can be made by injecting any rigid or semi-rigid thermoplastic material such as polyethylene or polypropylene, for example.

In the example described, the dispenser head is designed to be screwed onto the neck of a receptacle. However in a variant that is not shown, the dispenser head can be fixed by snap-fastening.

It is also possible to make the receptacle, the body 2 of the dispenser head, and the cap 8 as a single piece by a blow-injection or a blow-extrusion method.

The top end of the endpiece 6 is provided with a flow reducer member 20 made of an elastomer thermoplastic material, e.g. a mixture of polypropylene and of styrene-ethylene-butylene-styrene block copolymer.

The flow reducer member 20 has a flexible membrane 21 which possesses shape memory, which membrane is concave towards the outside when it is at rest.

Figure 4:
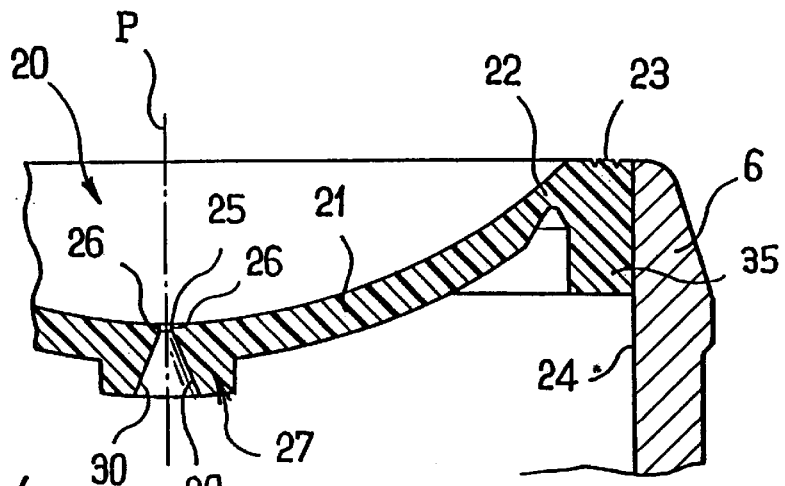
FIG. 4 is an enlarged view showing an implementation detail.

The periphery of the membrane 21 is connected via a thin annular zone 22 to a ring 35 secured via its radially outer surface to the radially inner surface 24 of the endpiece 6 as can be seen clearly in FIG. 4.

The flow reducer member 20 is provided with a slot 25 that is made during molding for the purpose of dispensing the fluid.

The slot 25 is defined laterally by two rectilinear edges 26 which do not touch in the example described, extending parallel to a plane P perpendicular to the section plane of FIG. 3 and coinciding with the section plane of FIG. 2.

The slot 25 is also bordered on the inside face of the membrane 21 by a bead of material 27 of thickness that is substantially twice the mean thickness of the membrane 21.

In its thin zone 22, the thickness of the membrane 21 is about half its mean thickness, thereby making it easier to deform outwards under the effect of thrust from the fluid.

Figure 6:
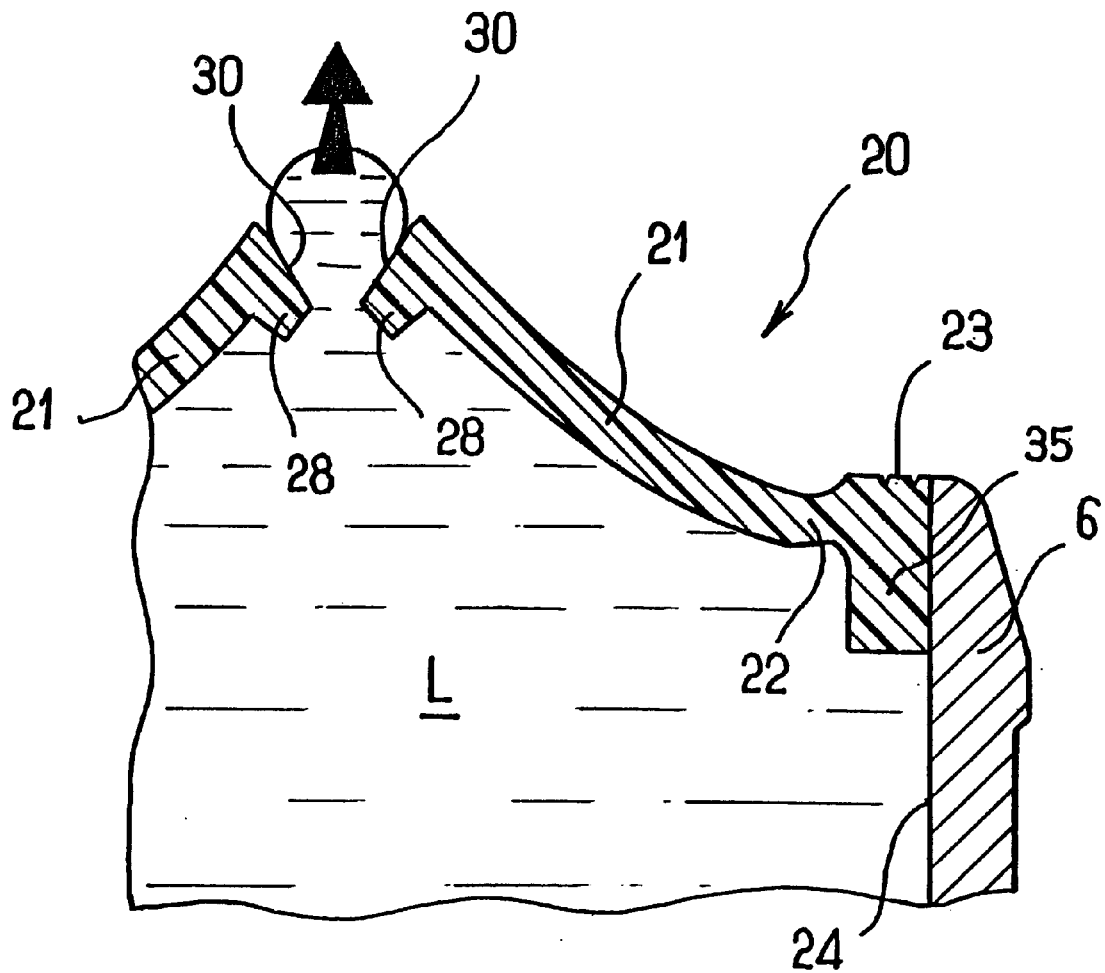
FIG. 6 shows the flow reducer member while dispensing fluid.

As can be seen in FIG. 6, the bead 27 comprises two parallel portions 28 running along the edges of the slot 25 and interconnected by two end portions 29 each of which is substantially semicircular in shape.

By their shape, these end portions 29 prevent any tear starter forming in line with the slot 25.

The facing faces 30 of the parallel portions 28 are inclined relative to the plane P and converge towards each other going towards the slot 25.

In the example described, the faces 30 are plane and are inclined at an angle of 45° relative to each other.

The width of the slot 25 at rest lies in the range 5/100ths of a millimeter and 1 mm, and preferably in the range 0.05 mm to 0.25 mm.

In the embodiment described, the width of the slot 25 is approximately 0.15 mm.

The length of the slot 25 can lie, for example, in the range 0.2 cm to 2 cm.

The dimensions of the slot 25 at rest are selected so as to substantially prevent any flow of fluid under the effect of gravity, even when the receptacle is upside-down with its dispenser head-down.

The flow reducer member 20 is molded after the body 2 and the cap 8 have been molded by injecting the thermoplastic elastomer material onto the endpiece 6 in the mold via an injection orifice whose axis lies in a midplane M perpendicular to the above-specified plane P.

The material used for making the flow reducer member is physically and chemically compatible with the material used for making the endpiece 6 so as to form a strong bond.

Figure 5:
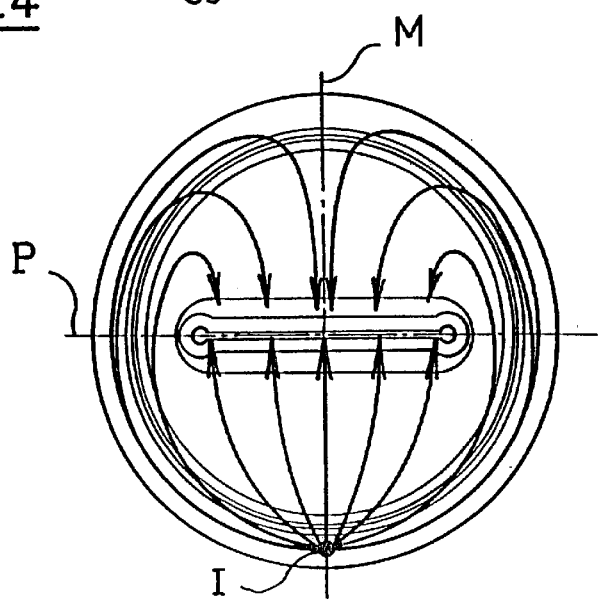
FIG. 5 is a view showing how material flows during molding.

FIG. 5 shows how the material flows in the mold during molding.

The injection point I is situated at the ring 35 in the midplane M.

It has been observed, surprisingly, that the thermoplastic elastomer material presses closely against the walls of the mold and more particularly against the walls forming the mold cavity in spite of the obstacle constituted by said walls, since the orientation thereof would lead the person skilled in the art to perform this injection from an injection point situated in line with the slot 25.

The zone of the mold that is situated diametrically opposite the injection point I is the last zone to be filled with thermoplastic material, but no significant zone of weakness forms at this location.

On examining FIG. 4, it will be observed that after unmolding there can be seen traces 23 of the injection orifice on the flow reducer member on the surface of the ring 35 via which the membrane 21 is connected to the endpiece 6.

The flow reducer member 20 operates as follows.

When the user squeezes the wall of the receptacle, the membrane 21 deforms outwards under the effect of thrust from the fluid L, and the edges of the slot 25 move apart, as shown in FIG. 6.

When the user releases the receptacle, the slot 25 returns to its initial shape, while still remaining open, thus allowing intake of air.

On its inside face, the cap 8 has a smooth bulge 40 shaped to match the shape of the concave side of the membrane 21 once the cap has been put into place on the body 2.

This avoids any volume of air being present over the membrane 21 when the cap 8 is in its closed position, since that might otherwise lead to any fluid residue present on the surface of the membrane 21 being degraded or becoming hard by drying, and that could impede proper operation of the flow reducer member at a later time.

The body 2 and the cap 8 in the example described are made of a translucent material of a color that is different from that used for making the flow reducer member 20.

The flow reducer member can thus still be seen when the cap 8 is closed, thereby improving the appearance of the assembly.

The invention is naturally not limited to the embodiment described above.

Figure 7:
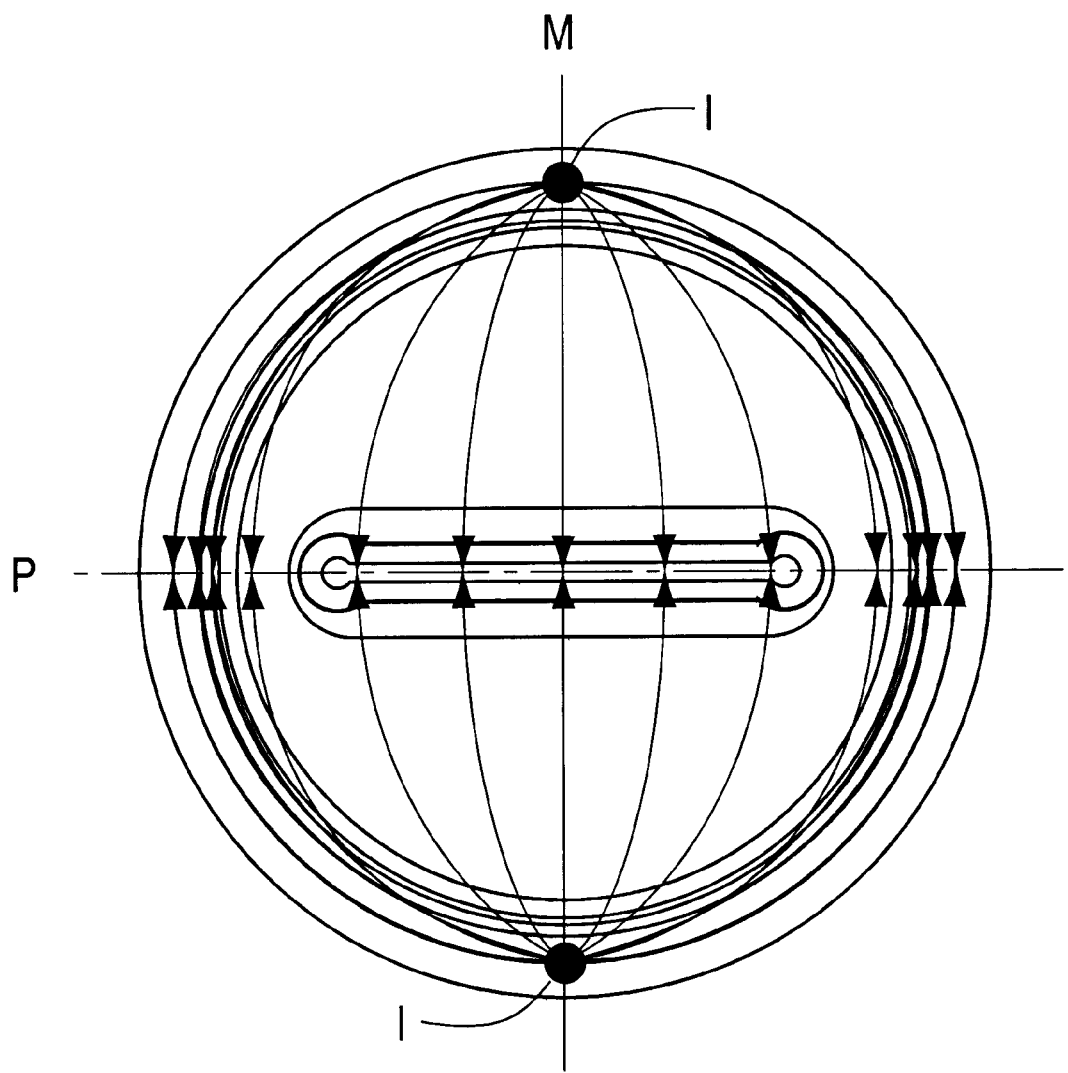
FIG. 7 is a view showing how material flows during molding.

In particular, the thermoplastic material for making the flow reducer member 20 can be injected into the mold via two injection points, for example, one corresponding to the above-specified injection point I and the other being symmetrical to the first about the plane P, as shown in FIG. 7

It will also be observed that although best results are obtained when the injection point(s) lie in the above-specified midplane M, satisfactory results have been obtained when the injection point(s) lie in a plane passing through the middle of the slot and at an angle that is less than or equal to 10°, 20°, or 30° with the midplane M (where 0° corresponds to a plane coinciding with the midplane M).

What is claimed is:

1. A method of making a dispenser head for dispensing a fluid, the head including a dispenser endpiece of rigid or semi-rigid plastic material and a flow reducer member of elastically deformable thermoplastic material secured to the endpiece, said member having at least one slot whose edges are suitable for moving apart under the effect of thrust from the fluid while it is being dispensed, the method including making the flow reducer member by injection molding from at least one injection point situated on at least one side of the slot.

2. A method according to claim 1, wherein said flow reducer member is overmolded onto said endpiece.

3. A method according to claim 1, wherein there is only one slot, which slot is bordered by a bead of material, and wherein the elastically deformable thermoplastic material is injected via an orifice whose axis is situated close to, or in, a midplane perpendicular to the longitudinal direction of the slot.

4. A method according to claim 3, wherein the axis of said orifice opens out into a periphery of the flow reducer member.

5. A method according to claim 1, wherein the edges of the at least one slot do not touch at rest.

6. A dispenser head, obtained by the method according to claim 1.

7. A method according to claim 1, wherein there is only one slot, which slot is bordered by a bead of material, and wherein the elastically deformable thermoplastic material is injected via two orifices having axes situated close to, or in, a midplane perpendicular to the longitudinal direction of the slot, but on opposite sides of the slot.

8. A method according to claim 7, wherein the axes of said orifices open out into a periphery of the flow reducer member.

9. A method according to claim 1, wherein said flow reducer member is made by dual injection with said endpiece.

10. A dispenser head for dispensing fluid, the head comprising a dispenser endpiece and an elastically deformable flow reducer member secured to the endpiece, said member having at least one slot whose edges are suitable for moving apart under the effect of thrust from the fluid while it is being dispensed, wherein said flow reducer member is made by injection molding and presents traces of at least one injection point on at least one side of the slot.

11. A dispenser head according to claim 10, wherein the flow reducer member comprises a flexible membrane having a thin zone at its periphery.

12. A dispenser head according to claim 11, wherein the thickness of said thin zone is substantially half the mean thickness of the membrane.

13. A dispenser head according to claim 10, wherein said membrane, when at rest, presents a shape that is concave towards the outside.

14. A dispenser head according to claim 10, wherein said slot is bordered by a bead of material.

15. A dispenser head according to claim 14, wherein said bead is made on the inside face of the flow reducer member and presents edges whose facing faces converge towards said slot.

16. A dispenser head according to claim 14, wherein said bead is substantially semicircular in shape in the vicinity of each axial end of the slot.

17. A dispenser head according to claim 14, wherein the thickness of said bead is substantially twice the mean thickness of said membrane.

18. A dispenser head according to claim 10, wherein the edges of the slot do not touch at rest.

19. A dispenser head according to claim 18, wherein the open width of the slot at rest lies in the range 0.05 mm to 1 mm.

20. A dispenser head according to claim 10, wherein said flow reducer member has traces of an injection point in a plane passing through the middle of the slot and at an angle less than or equal to 30° to the midplane perpendicular to the longitudinal direction of the slot.

21. A dispenser head according to claim 10, wherein said flow reducer member has traces of two injection points in a plane passing through the middle of the slot and making an angle less than or equal to 30° with the midplane perpendicular to the longitudinal direction of the slot, said injection points being disposed on either side of the slot.

22. A dispenser head according to claim 10, including a pivoting cap provided on its inside face with a smooth bulge suitable for coming into contact with the flow reducer member when the cap is closed.

23. A dispenser head according to claim 22, wherein the flow reducer member and the cap are of different colors, and wherein the cap is made of a translucent plastics material allowing the flow reducer member to be visible when the cap is closed.

24. A device for packaging and dispensing a fluid, the device comprising a receptacle and a dispenser head as defined in claim 10.

25. A flow reducer member for a dispenser endpiece, the member comprising an elastically deformable flexible membrane having a thin zone at its periphery, said membrane including a slot, the outside surface of the membrane being concave at rest and its inside surface also being provided, around the slot and in the immediate vicinity thereof, with a bead of material.

26. A flow reducer member according to claim 25, wherein said slot is open at rest.

* * * * *